June 30, 1925.
W. H. JOY
LUGGAGE CARRIER
Filed April 4, 1923
1,543,855
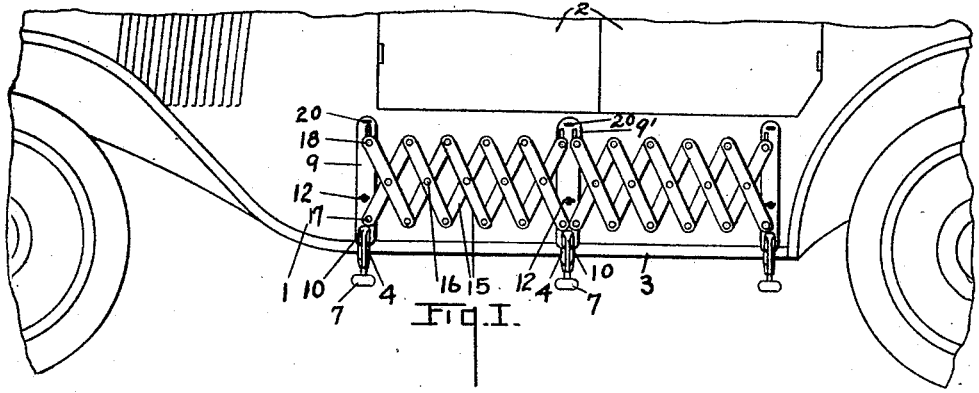
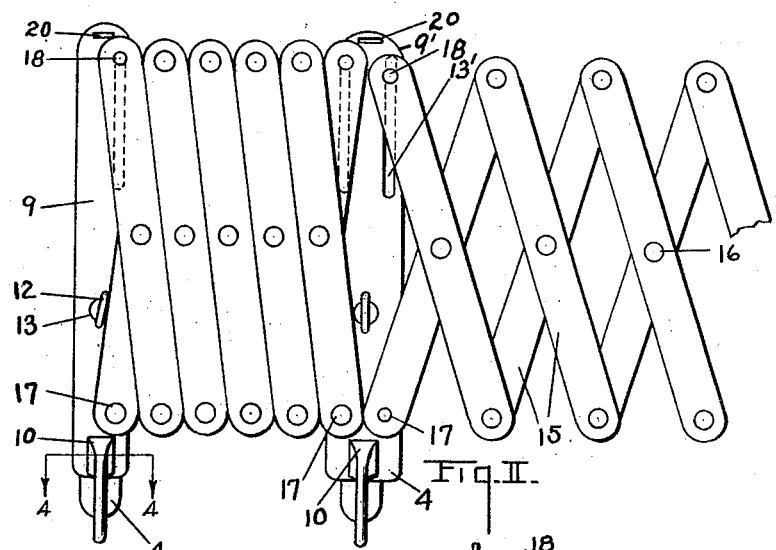
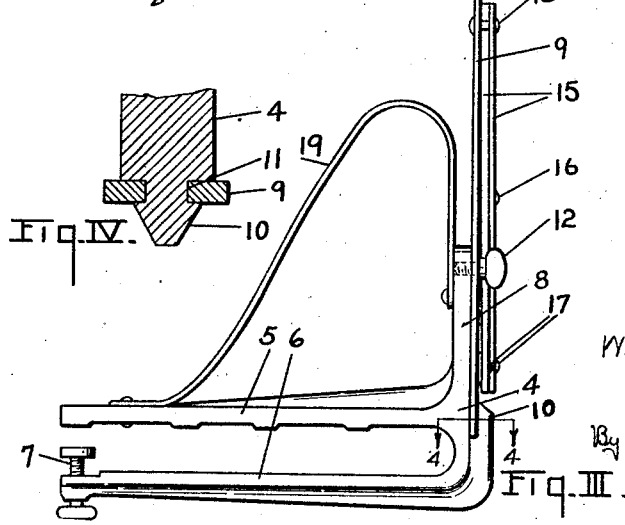
Inventor
William H. Joy
By Chappell Earl
Attorneys Patented June 30, 1925.

1,543,855

UNITED STATES PATENT OFFICE.

WILLIAM H. JOY, OF LANSING, MICHIGAN.

LUGGAGE CARRIER.

Application filed April 4, 1923. Serial No. 629,799.

*To all whom it may concern:*

Be it known that I, WILLIAM H. JOY, a citizen of the United States, residing at Lansing, county of Ingham, State of Michigan, have invented certain new and useful Improvements in Luggage Carriers, of which the following is a specification.

This invention relates to improvements in luggage carriers.

The main objects of the invention are:

First, to provide an improved luggage carrier which is adapted to be mounted upon the running board of an automobile and which may be adjusted laterally thereon to accommodate objects of different dimensions.

Second, to provide an improved luggage carrier adapted to be mounted upon the running board of an automobile, which may be partially collapsed if desired to afford access to either the front or rear doors.

Third, to provide an improved luggage carrier adapted to be mounted on the running board of an automobile which even when collapsed permits the opening doors to swing over the same.

Fourth, to provide an improved luggage carrier which may be knocked down and compactly arranged for storage and transportation, or readily set up.

Objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of the invention is clearly illustrated in the accompanying drawing forming a part of this application, in which:

Fig. I is a side view of my improved luggage carrier mounted upon the running board of an automobile, the automobile parts being shown conventionally.

Fig. II is a side elevation with one section collapsed, the other section being partially broken away.

Fig. III is an end elevation of my improved luggage carrier.

Fig. IV is a detail horizontal section on a line corresponding to line 4—4 of Fig. III, looking in the direction of the arrows, showing details of the detachable mounting means for the uprights of the carrier.

Fig. V is a perspective view of one of the uprights.

Similar reference characters refer to similar parts throughout the several views.

Referring to the drawing, 1 represents the body, 2 the doors and 3 the running board of an automobile. These parts are shown conventionally as the structural details thereof form no part of this invention.

I provide a plurality of clamps 4 adapted to be engaged with the running board of an automobile, these clamps having relatively long arms 5 and 6, the lower arm 6 being provided with a clamping screw 7. These arms are of such length that the carrier may be adjusted laterally of a running board and still effectively clamp thereon, thereby regulating the space between the carrier and the body of the automobile.

The clamps are provided with vertical upright supporting arms 8 for the uprights 9, the uprights 9 being detachably secured to these arms. At the base of the arms are headed boss-like lugs 10 with which the slots 11 in the lower ends of the uprights 9 may be engaged. The screws 12 are disposed through holes 13 and threaded into the arms 8. This provides a very secure connection for the uprights by the use of a single screw.

The intermediate upright 9' is of greater width than the uprights 9, it otherwise being the same with the exception that it has a pair of vertical slots 13', while the uprights 9 have only one of such slots. It also has a pair of holes 14, the purpose of which will appear.

I provide a pair of lazy tong structures, each consisting of a plurality of bars 15 arranged in crossed relation and connected at their crossing points by the pivots 16. The lower ends of the downwardly directed end bars of each lazy tong structure are connected by the pivots 17 to the uprights, the pivots being engaged in the holes 14 before referred to. The upper ends of the end members or bars of these lazy tong structures are provided with pins 18 which engage in the slots 13.

With this arrangement either lazy tong structure may be collapsed independently to expose the running board in front of one of the doors when it is desired to use the same as a step, and when it is desired to collapse the structure for storage or shipment the uprights are disengaged from the clamps.

The end clamps are provided with the A-shaped pieces 19 which serve as ends for the carrier. The uprights are preferably provided with slots 20 through which a strap or the like may be passed to secure an article within the carrier.

My improved carrier is simple and economical in its parts, may be readily adjusted in use, and may be quickly assembled or disassembled for storage.

Having thus described my invention, what I claim as new and desire to secure by Letters Patent is:

1. In a collapsible luggage carrier, the combination of clamps, each comprising an upright supporting arm and horizontally disposed spaced clamping arms of substantial length, the lower clamping arm being provided with a clamping screw at its inner end whereby the clamp may be secured to the running board of an automobile for adjustment transversely thereof, said upright supporting arm having a headed lug at the base thereof, uprights slotted at their lower ends to engage said headed lug, said uprights having longitudinal slots at their upper ends, clamping screws disposed through said uprights to engage said upright supporting arms coacting with said headed lug for detachably securing the uprights to said clamps, and a plurality of bars disposed and pivotally connected to provide lazy tong structure, the upper ends of the upwardly projecting end bars being provided with pins engaging said longitudinal slots at the upper ends of said uprights, the lower ends of the downwardly projecting end bars being pivoted to said uprights.

2. In a collapsible luggage carrier, the combination of running board clamps, each comprising an upright supporting arm, said upright supporting arm having a headed lug at the base thereof, uprights slotted at their lower ends to engage said headed lug, said uprights having longitudinal slots at their upper ends, clamping screws disposed through said uprights to engage said upright supporting arms coacting with said headed lug for detachably securing the uprights to said clamps, and a plurality of bars disposed and pivotally connected to provide lazy tong structure, the upper ends of the upwardly projecting end bars being provided with pins engaging said longitudinal slots at the upper ends of said uprights, the lower ends of the downwardly projecting end bars being pivoted to said uprights.

3. In a collapsible luggage carrier, the combination of clamps adapted for attachment to the running board of an automobile and having a headed lug at the base thereof, uprights slotted at their lower ends to engage said headed lug, said uprights having longitudinal slots at their upper ends clamping screws disposed through said uprights to engage said upright supporting arms coacting with said headed lug for detachably securing the uprights to said clamps, and a plurality of bars disposed and pivotally connected to provide lazy tong structure, the upper ends of the upwardly projecting end bars being provided with pins engaging said longitudinal slots at the upper ends of said uprights, the lower ends of the downwardly projecting end bars being pivoted to said uprights.

4. In a collapsible luggage carrier, the combination of clamps adapted for attachment to the running board of an automobile and having a headed lug at the base thereof, uprights slotted at their lower ends to engage said headed lug, clamping screws disposed through said uprights to engage said upright supporting arms coacting with said headed lug for detachably securing the uprights to said clamps, and a lazy tong structure mounted on said uprights.

In witness whereof, I have hereunto set my hand and seal.

WILLIAM H. JOY. [L. S.]